May 9, 1950 N. C. STULL 2,507,424
SPRING SUSPENSION FOR MOTOR VEHICLES
Filed April 6, 1946
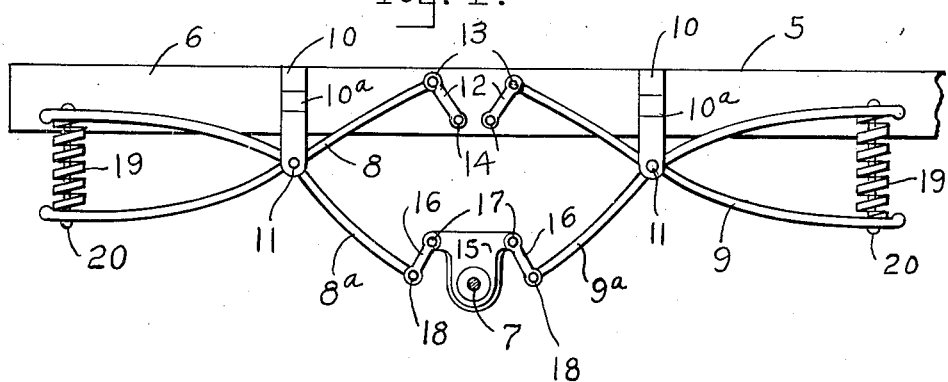
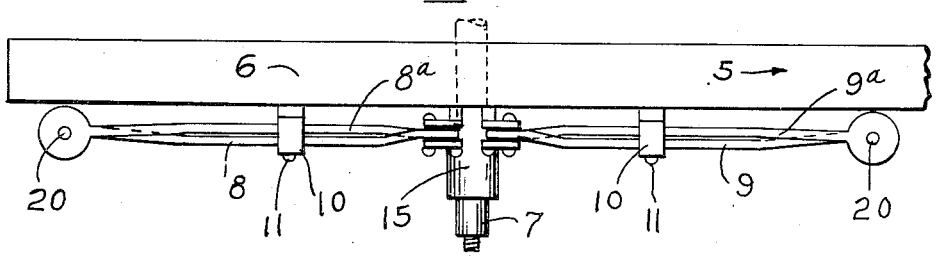
Norman C. Stull INVENTOR
BY *Fisher*
ATTORNEY Patented May 9, 1950

2,507,424

UNITED STATES PATENT OFFICE 2,507,424

SPRING SUSPENSION FOR MOTOR VEHICLES

Norman C. Stull, Cisne, Ill.

Application April 6, 1946, Serial No. 660,124

3 Claims. (Cl. 267—20)

This invention relates to spring suspensions for automobiles or motor vehicles, and the main object of the invention is to provide an improved form of spring suspension, designed for ease of riding and elimination of friction. Another object of the invention is to provide a spring suspension system for automobiles and motor vehicles wherein the elements are positioned and mounted longitudinally upon the side beams of the vehicle and in parallelism therewith instead of transversely thereto as in conventional arrangements, the said system including at each side levers pivotally connected at one end to the side bars of the vehicle and at their opposite ends to coil springs interposed between the rear ends of the crossed and pivotally connected levers, one of the said levers being medially joined to the rear axle of the vehicle, at each side thereof.

Another object of the invention is to provide in an improved form of spring suspension for motor vehicles of the kind referred to, the said vehicle including spaced side beams or bars positioned above a rear axle of the vehicle, elongated levers one at each side of the vehicle and pivotally connected at their inner ends to the inner sides of the side beams of the vehicle, complemental levers one at each side pivotally connected at their inner ends to the said axle of the vehicle, their free ends being extended medially across the first mentioned levers and medially pinned thereto at the crossing and thence extended rearwardly in vertical alignment with the rearwardly extended ends of the first mentioned levers, and in spaced relation thereto, coil springs mounted and braced at their ends between the said aligned ends of the two sets of levers, the said connections at the inner ends of the levers with the rear axle of the vehicle including pivotally joined intermediate elements.

With the stated objects in view, together with such other and additional objects and advantages as may appear from the specification, attention is now directed to the drawing, wherein:

Figure 1 is a side elevation showing the inner side of one of the longitudinally extended side beams or bars of an automotive vehicle, showing one construction of my improved spring suspension unit as mounted thereon in co-operative relation to and bearing upon the rear axle of the vehicle.

Figure 2 is a top plan view of the assembly as shown in Figure 1.

This invention is designed and adapted for mounting upon any conventional form of automotive vehicle, such as indicated generally at 5, and which vehicle includes a pair of laterally spaced and aligned side beams or bars 6, and the rear axle 7 transversely extended below them and connected with the chassis of the vehicle in the usual manner. As shown in one form of the spring suspension unit comprising the subject matter of the invention, and as illustrated in Figures 1 and 2, outer and inner pairs of elongated levers 8, 8a, and 9, 9a, are provided and are mounted in longitudinally spaced relation at the inner sides of the beams 6, the levers 8, 8a being located outwardly of the axle 7 and the levers 9, 9a inwardly thereof, the inner adjacent ends of these levers at each side of the vehicle being slightly spaced apart immediately at the axle 7 with the partings between these ends in substantial vertical alignment, all as disclosed in Figure 1. These pairs of levers are arranged in crossed relation along-side the beams 6 and are operatively supported in place by means of looped hangers 10 which are welded or otherwise secured as at 10a, in spaced relation upon the side beams 6, and are depended therefrom for engaging the crossed levers at either side of the axle 7, and which are pivotally mounted within the lower ends of the hangers by means of pivot bolts 11 passed through the hangers and through the interposed levers at the crossings thereof. The adjacent ends of the levers at each side of the vehicle are pivotally connected at their upwardly disposed ends to the inner faces of the beams 6 by means of toggle links 12, the same being angularly disposed as shown and pivoted at their upper ends by bolts 13 to the ends of the levers, and at their lower ends by bolts or studs 14 to the faces of the beams 6. Similarly the lower ends of the crossed levers 8, 8a and 9, 9a, are pivotally supported from brackets 15 mounted upon the ends of the axle 7, by means of toggle links 16 angularly extended and pivotally connected at their upper ends by bolts 17 to the upper corners of the brackets, and at their lower ends by bolts 18 to the lower ends of the levers 8a and 9a.

As thus mounted the free outer ends of these levers stand disposed in vertically aligned, spaced relation, at each side of the rear axle 7 and at each side of the vehicle, and they are resiliently supported in this relation by means of heavy coil springs 19 seated over supporting pins 20 which are vertically extended and slidably passed through the ends of the levers. In the operation of this unit, and as will be readily seen from an inspection of Figure 1, the weight of the vehicle as imposed upon the beams 6 will press the vehicle towards the axle 7, with the result that the adjacent inner ends of the crossed pairs of levers 8, 8a, and 9, 9a, will move towards one another, as will also their outer ends, thus pinching and compressing the springs 19, and providing easy and resilient riding action for the vehicle.

It is thought that the construction, operation and use of the invention and the structural features and function theerof, will be fully understood from the foregoing description, and while I have here described and shown certain specific elements of the invention and specific embodiments thereof, it is understood that the same as shown may be changed or modified, within the scope of the claims.

I claim:

1. A spring suspension for an automotive vehicle having a longitudinally extended side beam and a transversely extended axle with one end thereof disposed below the beam, the said spring suspension comprising pairs of elongated lever arms crossed over one another at medial points and pivotally pinned together thereat and to the lower ends of hangers depended in longitudinal spaced relation at one side of the said beam, said crossed lever arms being extended oppositely alongside the face of the beam with the arms in vertical alignment, the upwardly disposed inner ends of the lever arms being pivotally connected by means of toggle links to the inner face of the side beam, the downwardly disposed inner ends thereof being similarly connected to the end of the axle, and heavy coil springs mounted between the outer ends of the lever arms.

2. In a device according to claim 1, means for supporting the coil springs in operative position, said means including pins passed through the springs and slidably through the ends of the lever arms.

3. In a spring suspension unit for mounting upon a longitudinally extended side beam of an automotive vehicle having a transversely extended axle with one end thereof disposed beneath the beam in vertically spaced relation thereto, the said unit comprising a pair of looped hangers depended by their bight portions in spaced relation from the side beam at each side of the axle, two pairs of elongated levers crossed at medial points one over the other and pivotally pinned at the crossings between the pendant lower ends of the hangers, the inner adjacent ends of these levers being spaced vertically apart at the axle and in substantial vertical alignment, a pair of toggle links pivotally connected at their lower ends to the face of the side beam above the axle, the upper ends of these toggle links being disposed angularly apart, the inner adjacent and upwardly disposed ends of the elongated levers being pivotally connected to the upper ends of the toggle links at each side of the axle, a bracket mounted on the axle in vertical alignment with the said toggle links, a complementary pair of toggle links pivotally connected at their upper ends to the axle bracket at either side of the axle, the lower ends of these toggle links being disposed angularly apart, the inner adjacent and downwardly disposed ends of the elongated levers being pivotally connected to the lower ends of said complementary toggle links, heavy coil springs mounted between the outer and vertically aligned ends of said elongated lever arms, and supporting pins passed vertically through the springs and slidably through the ends of the lever arms.

N. C. STULL.

REFERENCES CITED

The following references are of record in the file of this patent:

UNITED STATES PATENTS

| Number | Name | Date |
|---|---|---|
| 892,051 | Hewitt | June 30, 1908 |
| 1,212,987 | Morrow | Jan. 16, 1917 |
| 1,898,567 | O'Connor | Feb. 21, 1933 |
| 2,043,889 | Erb | June 19, 1936 |
| 2,395,768 | Svoboda | Feb. 26, 1946 |

FOREIGN PATENTS

| Number | Country | Date |
|---|---|---|
| 456,890 | France | June 30, 1913 |
| 530,282 | France | Sept. 29, 1921 |